(12) United States Patent
Aust et al.

(10) Patent No.: US 9,422,982 B2
(45) Date of Patent: Aug. 23, 2016

(54) RADIAL ROLLING ELEMENT BEARING

(71) Applicant: Schaeffler Technologies AG & Co. KG, Herzogenaurach (DE)

(72) Inventors: Jan-Rene Aust, Erlangen (DE); Ekrem Akyol, Forchheim (DE); Edgar Schedl, Cadolzburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/652,247

(22) PCT Filed: Nov. 8, 2013

(86) PCT No.: PCT/DE2013/200285
§ 371 (c)(1),
(2) Date: Jun. 15, 2015

(87) PCT Pub. No.: WO2014/090239
PCT Pub. Date: Jun. 19, 2014

(65) Prior Publication Data
US 2015/0330450 A1  Nov. 19, 2015

(30) Foreign Application Priority Data

Dec. 14, 2012  (DE) .......................... 10 2012 223 222

(51) Int. Cl.
*F16C 33/58* (2006.01)
*F16C 43/04* (2006.01)
(Continued)

(52) U.S. Cl.
CPC ............. *F16C 33/586* (2013.01); *F16C 19/225* (2013.01); *F16C 19/26* (2013.01);
(Continued)

(58) Field of Classification Search
CPC .... F16C 19/463; F16C 19/466; F16C 33/605; F16C 35/07; F16C 35/077

USPC .................. 384/559, 560, 561, 564, 569, 585
See application file for complete search history.

(56) References Cited

U.S. PATENT DOCUMENTS 2,057,102 A * 10/1936 Lemell .................... F16C 19/46
384/564
2,094,252 A *  9/1937 Young .................... F16C 19/26
384/561

(Continued)

FOREIGN PATENT DOCUMENTS

| DE | 2931348 | 2/1982 |
|----|---------|--------|
| DE | 10246527 | 6/2003 |
| FR | 913745 | 9/1946 |

*Primary Examiner* — Phillip A Johnson
(74) *Attorney, Agent, or Firm* — Volpe and Koenig, P.C.

(57) ABSTRACT

A radial rolling element bearing (1) formed of a cylindrical outer ring (3) that is inserted into a housing (2), and a rolling element cage (4) arranged in said outer ring and formed by a plurality of roller-shaped rolling bodies (6) which are inserted into a bearing cage (5) and held thereby, equidistantly, in a circumferential direction, and roll on an outer raceway (8) formed by the inner lateral surface (7) of the outer ring, and on an inner raceway (11) formed by the outer lateral surface (9) of a shaft (10) to be mounted or a smooth cylindrical inner ring pushed onto said shaft. The roller race is axially guided by two separate flanged disks (14, 15) which lie against the axial sides (12, 13) of the outer ring and are axially secured, together with the outer ring, by securing elements which engage in recesses (16, 17) in the housing. According to the invention, this radial rolling element bearing is characterized in that said flanged disks include a right-angled profiled cross-section that has a horizontal securing leg (18, 20) and a vertical flanged leg (19, 21) and, by pressing their horizontal securing legs onto two peripheral stepped shoulders (22, 23) in the edge regions of the outer lateral surface (24) of the outer ring, are secured thereto; and in that the securing elements which engage in recesses in the housing for the purpose of axially securing said rolling element bearing are designed as spring elements (25, 26) integrated into the securing legs of the flanged disks.

8 Claims, 2 Drawing Sheets

(51) Int. Cl.
   *F16C 19/26* (2006.01)
   *F16C 35/077* (2006.01)
   *F16C 19/22* (2006.01)
   *F16C 33/60* (2006.01)
   *F16C 19/46* (2006.01)

(52) U.S. Cl.
   CPC ............ *F16C 33/585* (2013.01); *F16C 33/605* (2013.01); *F16C 35/077* (2013.01); *F16C 19/46* (2013.01); *F16C 2226/74* (2013.01)

(56) References Cited

U.S. PATENT DOCUMENTS

| | | | | |
|---|---|---|---|---|
| 3,004,808 A | * | 10/1961 | Powers | F16C 19/46 384/564 |
| 4,558,962 A | * | 12/1985 | Meinlschmidt | F16B 21/18 384/561 |
| 5,685,650 A | * | 11/1997 | Martinie | F16C 35/073 384/538 |
| 2003/0099419 A1 | | 5/2003 | Vignotto et al. | |

* cited by examiner

RADIAL ROLLING ELEMENT BEARING

FIELD OF THE INVENTION

The invention relates to a radial rolling element bearing which can be used in an especially advantageous way as a movable bearing for high radial forces and low axial forces for the support of shafts.

BACKGROUND

In rolling bearing technology, it is generally known that shafts are usually supported at two bearing points formed as a fixed bearing and as a movable bearing, because this allows production tolerances and changes in length caused by thermal elongation between the shaft and the housing to be equalized, without additional deformation forces acting on the bearing. Here, the axially stationary fixed bearing absorbs, in addition to its radial load component, also all axial forces that occur in both directions, while the movable bearing transfers only its radial load component, because it is not fixed in the axial direction and therefore also cannot absorb any axial forces. The equalization of the production tolerances and thermal elongations is thus realized exclusively by means of the movable bearing, in particular, at the seating position of the inner ring or in the bearing itself.

A class-forming radial rolling element bearing for a typical movable bearing for a shaft subjected to high radial loads is previously known, for example, from DE 2 931 348 A1. This movable bearing constructed as a radial cylindrical rolling element bearing is made essentially from a smooth cylindrical outer ring inserted into a housing and is formed by a plurality of rolling bodies that are inserted into a bearing cage and held by this cage at equal intervals in the circumferential direction. The rolling bodies constructed as cylindrical rollers here roll on an outer raceway formed by the inner lateral surface of the outer ring and on an inner raceway that is formed by the outer later surface of a smooth cylindrical inner ring slid onto the shaft and is formed in other applications also by the outer lateral surface of the shaft itself. For the axial guidance of the rolling element cage, on the axial sides of the outer ring there are also two separate flanged disks that are fixed against axial displacement together with the outer ring by, on one side, a circlip engaging in a peripheral groove in the housing and, on the other side, retaining elements formed as an adjustable locking ring.

A disadvantage in the radial rolling element bearing described above, however, is that the separate flanged disks must be delivered separately by the bearing manufacturer and thus cause relatively high installation effort for the bearing user. In addition, the axial securing of the outer ring and the flanged disks contacting this ring is done by two additional separate parts that must also be delivered by the bearing manufacturer and stored separately for high bearing quantities in addition to the flanged disks supplied separately. The already high effort for the installation of such radial rolling element bearings is thus increased even more by labor-intensive removal of the securing elements from storage and the necessary use of separate installation tools for these securing elements and therefore has proven extremely uneconomical.

SUMMARY

Starting from the stated disadvantages of the known prior art, the invention is therefore based on the objective of designing a radial rolling element bearing in which the installation and the securing of the outer ring against axial displacement are simplified by reducing the separate parts and made possible without separate installation tools. The invention is therefore distinguished by low installation costs.

According to the invention, this objective is achieved for a radial rolling element bearing in that the flanged disks have a right-angled profile cross section with a horizontal securing leg and a vertical flanged leg and are fixed on the outer ring by pressing their horizontal securing legs on two peripheral step shoulders in the edge areas of the outer lateral surface of the outer ring and the securing elements engaging in recesses in the housing are constructed for the axial fixing of the rolling element bearing as spring elements integrated in the securing legs of the flanged disks.

The invention is thus based on the non-obvious knowledge that it is possible, by fixing the flanged disks on the outer ring and through a suitable form of integrating the securing elements in the flanged disks, on one hand, to minimize the number of separate parts and thus the required delivery quantity for the manufacturer for such radial rolling element bearings and, on the other hand, to simultaneously considerably reduce their installation work and costs, because securing elements no longer must be removed from a storage container and the rolling element bearings preassembled with the flanged disks can be inserted into a housing in a single processing step without special installation tools.

Preferred constructions and advantageous refinements of the radial rolling element bearing constructed according to the invention are described below and in the claims.

Accordingly, for one embodiment of the radial rolling element bearing the horizontal securing legs of the flanged disks are fixed to the outer ring by means of several centering beads that are formed in their circumferential surfaces distributed equally over the periphery and directed radially inward on the surrounding step shoulders in the edge areas of the outer lateral surface of the outer ring. These centering beads are embossed in a perpendicular arrangement over the entire width of the circumferential surfaces of the securing legs of the flanged disks and preferably have a semicircular profile cross section through which these have a linear contact to the step shoulders in the outer ring. For exact centering and fixing of the flanged disks on the step shoulders in the outer ring, it has proven sufficient to arrange three of these centering beads offset by 120° relative to each other on the circumferential surface of the securing leg of each flanged disk, wherein, however, more than three centering beads per flanged disk would also be possible. It is also possible to realize the fixing of the securing leg of the flanged disk on the surrounding step shoulders of the outer ring instead with centering beads in a perpendicular arrangement with several center punched points or the like that are distributed equally in the circumferential direction and are formed axially in the center in the securing legs and then have a point contact to the step shoulders in the outer ring.

A preferred refinement of the radial rolling element bearing according to the invention provided that the depth of the step shoulders on the outer ring corresponds to the material thickness of the securing legs plus the depth of the center punched points. In this way, the circumferential surfaces of the securing legs of the flanged disks and the outer lateral surface of the outer ring are arranged in a horizontal plane and thus advantageously form a smooth cylindrical bearing outer jacket.

The radial rolling element bearing according to the invention is further distinguished in that the spring elements integrated in the securing legs of the flanged disks are constructed for axial fixing of the rolling element bearing as elastic locking tabs that are formed from the securing legs and have, on their free ends, a bulge or angled section directed radially outward. The forming of the locking tabs can be realized for each locking tab either through two linear cuts of the same length that extend from the free edge of the securing leg and are formed perpendicular in this bracket or through a U-shaped cut that is formed out from the securing leg and whose center part is parallel to the edge of the securing leg. The bulges or angled sections formed at the free ends of the locking tabs are then the parts of the locking tabs that engage, for axial fixing of the rolling element bearing, in two recesses in the bearing seat of a housing, wherein the recesses are constructed, for locking tabs with bulges, as two surrounding grooves and, for locking tabs with angled sections, as two multiply interrupted grooves or two rows of holes. An optimal axial fixing of the rolling element bearing is achieved when each flanged disk also has three locking tabs that are offset to each other by 120° and are each arranged centrally between the centering beads in its securing leg, wherein, however, fewer than three locking tabs per flanged disk could also be sufficient.

Finally, another feature of the radial rolling element bearing according to the invention is disclosed in which the gaps produced by the centering beads in the securing legs between these brackets and the step shoulders on the outer ring are constructed, on one hand, as spring deflection spaces for the locking tabs during the bearing installation and, on the other hand, as bonding gaps for connecting the flanged disks to the outer ring. Because the bulges or angled sections at the ends of the locking tabs project past the circumferential surfaces of the securing legs of the flanged disks, it is necessary for the installation of the radial rolling element bearing to lower these radially to the level of the circumferential surfaces for the non-obstructed insertion of the bearing into the bearing seat. The space required for this underneath the securing legs of the flanged disks thus can be provided by the gaps that are created by the centering beads in the securing legs between these brackets and the step shoulders on the outer ring. At the same time, these gaps have a suitable defined height and depth so that they can be used with an adhesive for the final connection of the flanged disks to the outer ring. For this purpose, the bonding gaps are filled completely with an adhesive, advantageously from the group of two-component adhesives or from the group of anaerobic adhesives, wherein this adhesive is optionally mixed with a sphere-shaped filler material, for example, titanium oxide or aluminum powder, wherein, for securing the function of the locking tabs on the flanged disks, the spring deflection spaces are kept free from adhesive in a suitable way.

BRIEF DESCRIPTION OF THE DRAWINGS

A preferred embodiment of the radial rolling element bearing constructed according to the invention is explained in more detail below with reference to the accompanying drawings. Shown are.

DETAILED DESCRIPTION OF THE PREFERRED EMBODIMENTS

Figure 1:
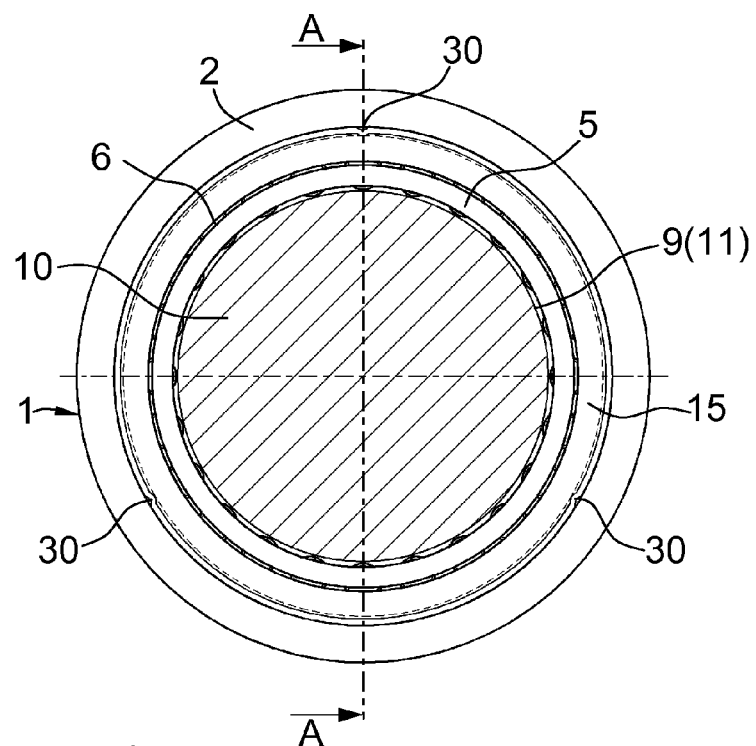
FIG. 1 a schematic diagram of a side view of a radial rolling element bearing constructed according to the invention and supporting a shaft and inserted in a housing, FIG. 2 a schematic diagram of the cross section A-A according to FIG. 1 by the radial rolling element bearing constructed according to the invention and inserted in a housing, FIG. 3 an enlarged schematic diagram of the detail X of the radial rolling element bearing according to FIG. 2 constructed according to the invention, FIG. 4 an enlarged diagram of a top view of one of the two separate flanged disks of the radial rolling element bearing constructed according to the invention, FIG. 5 the diagram of the cross section B-B by the separate flanged disk of the radial rolling element bearing according to FIG. 4 constructed according to the invention, FIG. 6 the again enlarged view C of the separate flanged disk of the radial rolling element bearing according to FIG. 4 constructed according to the invention.
Figure 2:
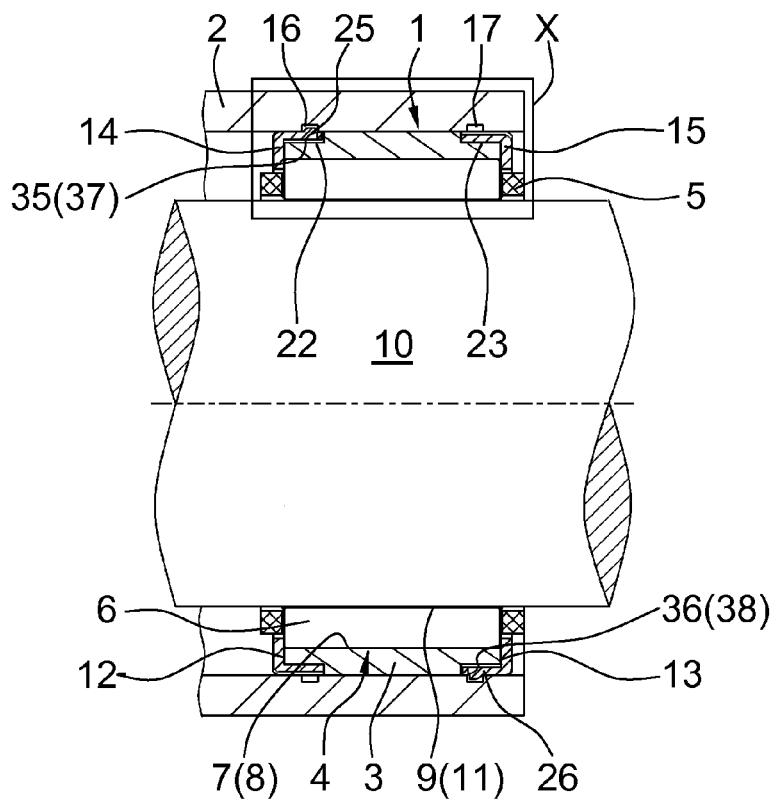

FIGS. 1 and 2 show schematically a radial rolling element bearing 1 constructed as a movable bearing for supporting a shaft 10, wherein this bearing essentially is formed of a cylindrical outer ring 3 inserted in a housing 2 and a rolling element cage 4 arranged in this outer ring 3. This rolling element cage 4 is formed in a known way by a plurality of roller-shaped rolling bodies 6 that are inserted in a bearing cage 5 and are held by this cage in the circumferential direction at equal intervals and roll on an outer raceway 8 formed by the inner lateral surface 7 of the outer ring 3 and on an inner raceway 11 formed by the outer lateral surface 9 of the shaft 10. In a clearly visible way, the axial guidance of the rolling element cage 4 is realized by two separate flanged disks 14, 15 that contact the axial sides 12, 13 of the outer ring 3 and are fixed axially together with the outer ring 3 by securing elements engaging in recesses 16, 17 in the housing 2.

Figure 3:
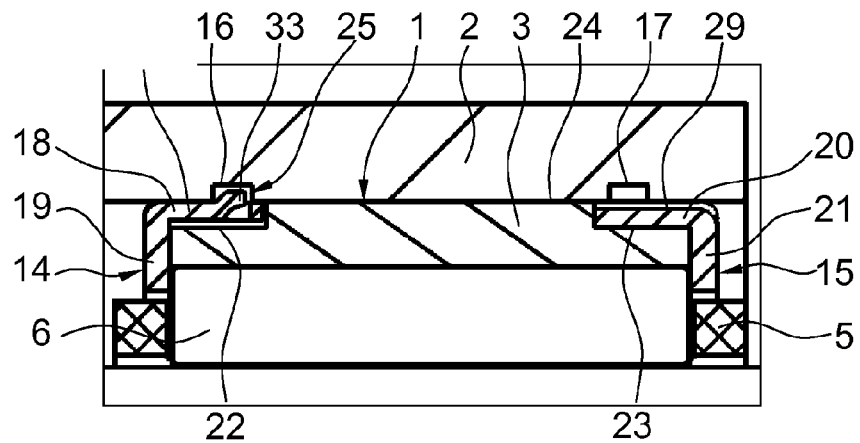

From FIGS. 2 and 3 it can also be seen that the flanged disks 14, 15 have a right-angled profile cross section with a horizontal securing leg 18, 20 and a vertical flanged leg 19, 21 and are fixed on the outer ring by pressing its horizontal securing legs 18, 20 on two surrounding step shoulders 22, 23 in the edge areas of the outer lateral surface 24 of the outer ring 3 and the securing elements engaging in recesses 16, 17 in the housing 2 are constructed for axial fixing of the rolling element bearing 1 as spring elements 25, 26 integrated in the securing legs 18, 20 of the flanged disks 14, 15.

Figure 4:
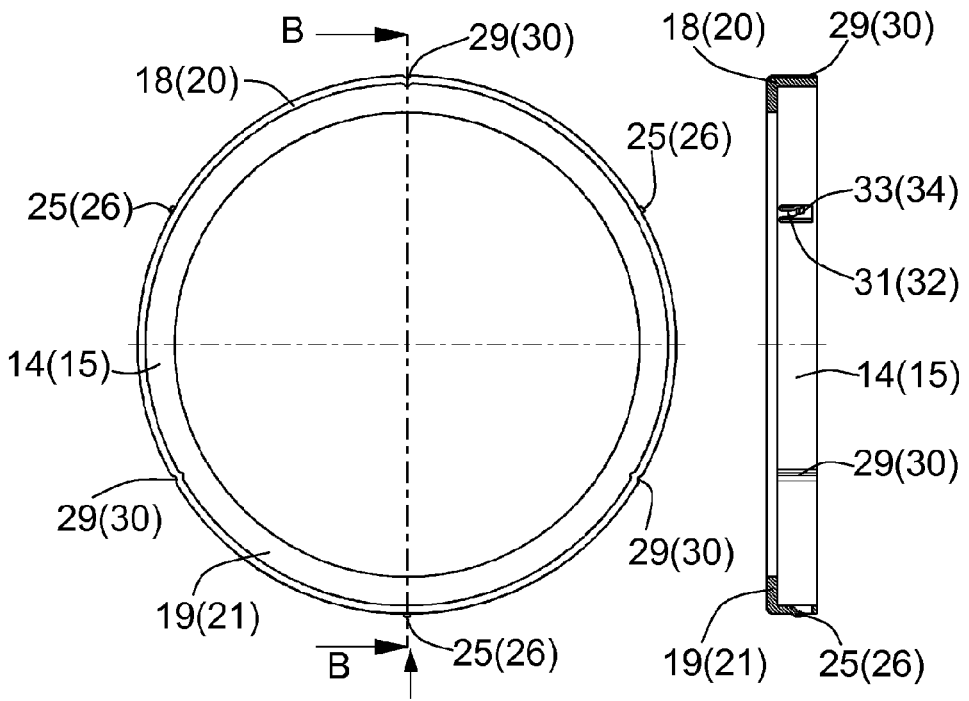
Figure 5:
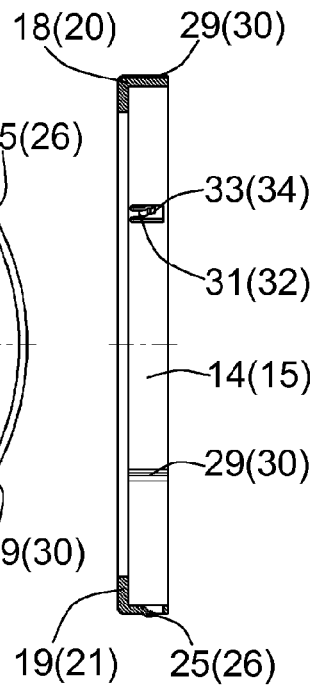
Figure 6:
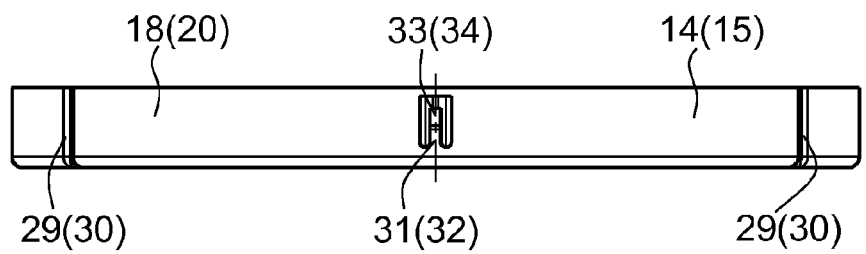

In FIGS. 4 to 6 it is to be seen that the horizontal securing legs 18, 20 of the flanged disks 14, 15 are fixed by means of three centering beads 29, 30 that are formed offset relative to each other by 120° in their circumferential surfaces 27, 28 and are directed radially inward on the surrounding step shoulders 22, 23 on the outer ring 3. These centering beads 29, 30 are embossed in a perpendicular arrangement over the entire width of the circumferential surfaces 27, 28 of the securing legs 18, 20 and have a semicircular profile cross section through which these have a linear contact to the step shoulders 22, 23 in the outer ring 3. The depth of the step shoulders 22, 23 on the outer ring 3 here corresponds, as FIG. 3 shows, to the material thickness of the securing legs 18, 20 plus the depth of the centering beads 29, 30, so that the circumferential surfaces 27, 28 of the securing legs 18, 20 of the flanged disks 14, 15 and the outer lateral surface 24 of the outer ring 3 are arranged in a horizontal plane.

It also emerges from FIG. 6, in particular, that the spring elements 25, 26 integrated in the securing legs 18, 20 for the axial guidance of the rolling element bearing 1 are constructed as elastic locking tabs 31, 32 that are shaped from the securing legs 18, 20 and have, on their free ends, a bulge 33, 34 directed radially outward. The shaping of the locking tabs 31, 32 is realized here for each locking tab 31, 32 by a U-shaped cut from the securing leg 18, 20, whose center part runs parallel to the edge of the securing leg 18, 20. The bulge 33, 34 formed on the free ends of the locking tabs 31, 32 then engage in the two recesses 16, 17 in the bearing seat of the housing 2 for the axial fixing of the rolling element bearing 1, wherein the recesses 16, 17 are preferably constructed as two surrounding grooves. Here, each flanged disk 14, 15, as shown in FIG. 4, also has three locking tabs 31, 32 arranged offset to each other by 120° and arranged centrally between the centering beads 29, 30 in its securing leg 18, 20, so that an optimal axial fixing of the rolling element bearing 1 is achieved.

Finally, from FIGS. 2 and 3 it can also be seen that the gaps created by the centering beads 29, 30 in the securing legs 18, 20 between these brackets and the step shoulders 22, 23 on the outer ring 3 are constructed, on one hand, as spring deflection spaces 35, 36 for the locking tabs 31, 32 during the bearing installation and, on the other hand, as bonding gaps 37, 38 for connecting the flanged disks 14, 15 to the outer ring 3. Because the bulges 33, 34 on the ends of the locking tabs 31, 32 project past the circumferential surfaces 27, 28 of the securing legs 18, 20 of the flanged disks 14, 15, for the unobstructed installation of the radial rolling element bearing 1 it is necessary to lower these in the bearing seat radially to the level of the circumferential surfaces 27, 28 of the securing legs 18, 20. The space required for this underneath the securing legs 18, 20 of the flanged disks 14, 15 is thus provided by the gaps that are created by the centering beads 29, 30 in the securing legs 18, 20 between these brackets and the step shoulders 22, 23 on the outer ring 3. At the same time, these gaps have a suitable height and depth to be able to use these with an adhesive for the final connection of the flanged disks 14, 15 to the outer ring 3. The bonding gaps are therefore filled completely with an adhesive from the group of two-component adhesives, wherein this adhesive is mixed with a sphere-shaped filler material, for example, titanium oxide, wherein the spring deflection spaces of the locking tabs 31, 32 are kept free from adhesive.

| List of reference numbers | |
| --- | --- |
| 1 | Radial rolling element bearing |
| 2 | Housing |
| 3 | Outer ring |
| 4 | Rolling element cage |
| 5 | Bearing cage |
| 6 | Rolling body |
| 7 | Inner lateral surface of 3 |
| 8 | Outer raceway of 6 |
| 9 | Outer lateral surface of 10 |
| 10 | Shaft |
| 11 | Inner raceway of 3 |
| 12 | Axial side of 3 |
| 13 | Axial side of 3 |
| 14 | Flanged disk of 12 |
| 15 | Flanged disk of 13 |
| 16 | Recess in 2 |
| 17 | Recess in 2 |
| 18 | Securing leg of 14 |
| 19 | Flanged bracket of 14 |
| 20 | Securing leg of 15 |
| 21 | Flanged bracket of 15 |
| 22 | Step shoulder in 24 |
| 23 | Step shoulder in 24 |
| 24 | Outer lateral surface of 3 |
| 25 | Spring element in 18 |
| 26 | Spring element in 20 |
| 27 | Circumferential surface of 18 |
| 28 | Circumferential surface of 20 |
| 29 | Centering beads in 27 |
| 30 | Centering beads in 28 |
| 31 | Locking tabs in 18 |
| 32 | Locking tabs in 20 |
| 33 | Bulge on 31 |
| 34 | Bulge on 32 |
| 35 | Spring deflection space for 31 |
| 36 | Spring deflection space for 32 |
| 37 | Bonding gap for 14 |
| 38 | Bonding gap for 15 |

The invention claimed is:

1. A radial rolling element bearing, comprising: a cylindrical outer ring inserted in a housing and a rolling element cage arranged in said outer ring formed by a plurality of roller-shaped rolling bodies inserted in a bearing cage and held by said cage at equal intervals in a circumferential direction and roll on an outer raceway formed by an inner lateral surface of the outer ring and on an inner raceway formed by an outer lateral surface of a shaft to be supported or of a smooth cylindrical inner ring slid onto the shaft, two separate flanged disks that contact axial sides of the outer ring provide axial guidance of the rolling element cage and are fixed axially together with the outer ring by securing elements engaging in recesses in the housing, the flanged disks have a right-angled profile cross section with a horizontal securing leg and a vertical flanged leg and are fixed on the outer ring by pressing of said respective horizontal securing legs on two peripheral step shoulders in edge regions of an outer lateral surface of the outer ring and the securing elements that engage in the recesses in the housing are constructed for axial fixing of the rolling element bearing as spring elements integrated in the securing leg of the flanged disks.

2. The radial rolling element bearing according to claim 1, wherein the horizontal securing legs of the flanged disks are fixed on the outer ring by several centering beads that are formed in circumferential surfaces distributed equally over a periphery of the outer ring and are also directed radially inward on the peripheral step shoulders in the edge areas of the outer lateral surface of the outer ring.

3. The radial rolling element bearing according to claim 2, wherein a depth of the step shoulders on the outer ring corresponds to a material thickness of the securing legs plus a depth of the centering beads, so that the circumferential surfaces of the securing legs of the flanged disks and the outer lateral surface of the outer ring are arranged in a horizontal plane.

4. The radial rolling element bearing according to claim 3, wherein the spring elements integrated in the securing legs are constructed for axial fixing of the rolling element bearing as elastic locking tabs that are formed from the securing legs and have a bulge or angled section directed radially outward on ends of each of the securing legs.

5. The radial rolling element bearing according to claim 4, wherein gaps created by the centering beads in the securing legs between the securing legs and the step shoulders on the outer ring are constructed as spring deflection spaces for the locking tabs during bearing installation and as bonding gaps for connecting the flanged disks to the outer ring.

6. The radial rolling element bearing according to claim 5, wherein the bonding gaps interrupted by the spring deflection spaces are filled completely with adhesive.

7. The radial rolling element of claim 6, wherein the adhesive is selected from one of a two-component adhesive or an anaerobic adhesion.

8. The radially rolling element of claim 6, wherein the adhesive is mixed with a sphere-shaped filler material.

* * * * *